United States Patent
Shanov et al.

(10) Patent No.: US 10,843,113 B2
(45) Date of Patent: Nov. 24, 2020

(54) CYCLONIC OIL SEPARATOR FOR COMPRESSOR OIL RESERVOIR

(71) Applicant: Ingersoll-Rand Company, Davidson, NC (US)

(72) Inventors: Adrian Shanov, Charlotte, NC (US); David Lackey, Statesville, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 409 days.

(21) Appl. No.: 15/340,461

(22) Filed: Nov. 1, 2016

(65) Prior Publication Data

US 2018/0117510 A1    May 3, 2018

(51) Int. Cl.
| | | |
|---|---|---|
| *B01D 45/16* | (2006.01) | |
| *B04C 5/103* | (2006.01) | |
| *B04C 5/081* | (2006.01) | |
| *B04C 5/04* | (2006.01) | |
| *B04C 5/185* | (2006.01) | |
| *B04C 5/14* | (2006.01) | |
| *B04C 5/13* | (2006.01) | |

(52) U.S. Cl.
CPC ............... *B01D 45/16* (2013.01); *B04C 5/04* (2013.01); *B04C 5/081* (2013.01); *B04C 5/103* (2013.01); *B04C 5/13* (2013.01); *B04C 5/14* (2013.01); *B04C 5/185* (2013.01)

(58) Field of Classification Search
None
See application file for complete search history.

(56) References Cited

U.S. PATENT DOCUMENTS

| | | | | |
|---|---|---|---|---|
| 3,052,359 A | * | 9/1962 | Rounds | B01D 21/0018 210/299 |
| 3,898,068 A | * | 8/1975 | McNeil | B01D 45/12 55/337 |
| 4,260,402 A | * | 4/1981 | Shaffer | B01D 46/0031 55/330 |
| 5,011,388 A | | 4/1991 | Aoki et al. | |
| 5,494,501 A | | 2/1996 | Anspach et al. | |

(Continued)

FOREIGN PATENT DOCUMENTS

| | | |
|---|---|---|
| DE | 202006011229 U1 | 9/2007 |
| EP | 0719910 A1 | 7/1996 |
| EP | 1669119 B1 | 12/2008 |

*Primary Examiner* — Christopher P Jones
*Assistant Examiner* — Phillip Y Shao
(74) *Attorney, Agent, or Firm* — Taft Stettinius & Hollister LLP

(57) ABSTRACT

A compressor system includes an oil reservoir capable of producing a mixed air/oil flow of fluid via a breather port, as well as a cyclonic separator having an inlet annulus and a tapered section extending from the inlet annulus. The inlet annulus structured to swirl the mixed air/oil flow prior to moving toward a tapered internal section of the separator. A center post is positioned in the tapered internal section and includes a number of discs arranged along a length of the center post. The discs can be separate discs that are stacked upon one another to form the center post. The discs can include a skirt portion and a neck having one or more openings that permit a flow of at least air to enter into a central bore of the center post from the tapered internal section before exiting the separator.

13 Claims, 3 Drawing Sheets

(56) References Cited

U.S. PATENT DOCUMENTS

| | | | |
|---|---|---|---|
| 5,755,965 A * | 5/1998 | Reiber | B01D 19/0057 |
| | | | 210/512.1 |
| 6,554,595 B2 | 4/2003 | Hide et al. | |
| 7,288,138 B2 | 10/2007 | Showalter et al. | |
| 7,288,139 B1 | 10/2007 | Showalter | |
| 7,488,378 B2 | 2/2009 | Van Den Berghe | |
| 7,531,018 B2 | 5/2009 | Becker et al. | |
| 7,578,863 B2 | 8/2009 | Becker et al. | |
| 7,655,078 B2 | 2/2010 | Saito et al. | |
| 8,529,668 B2 | 9/2013 | Short et al. | |
| 8,852,330 B2 * | 10/2014 | Naess | B01D 19/0057 |
| | | | 96/156 |
| 8,992,648 B2 | 3/2015 | Sakai | |
| 2007/0163442 A1 * | 7/2007 | Saito | B01D 19/0057 |
| | | | 96/209 |
| 2015/0273374 A1 | 10/2015 | Leiss | |
| 2015/0283488 A1 * | 10/2015 | Shin | B01D 3/08 |
| | | | 55/447 |

* cited by examiner

CYCLONIC OIL SEPARATOR FOR COMPRESSOR OIL RESERVOIR

TECHNICAL FIELD

The present invention generally relates to air compressor separators, and more particularly, but not exclusively, to air compressor cyclonic separators.

BACKGROUND

Providing separation of an air-oil mixture remains an area of interest for air compressor system. Some existing systems have various shortcomings relative to certain applications. Accordingly, there remains a need for further contributions in this area of technology.

SUMMARY

One embodiment of the present invention is a unique air-oil separator used in an air compressor system. Other embodiments include apparatuses, systems, devices, hardware, methods, and combinations for cyclonic separation of air and oil from an oil reservoir in an air compressor system. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
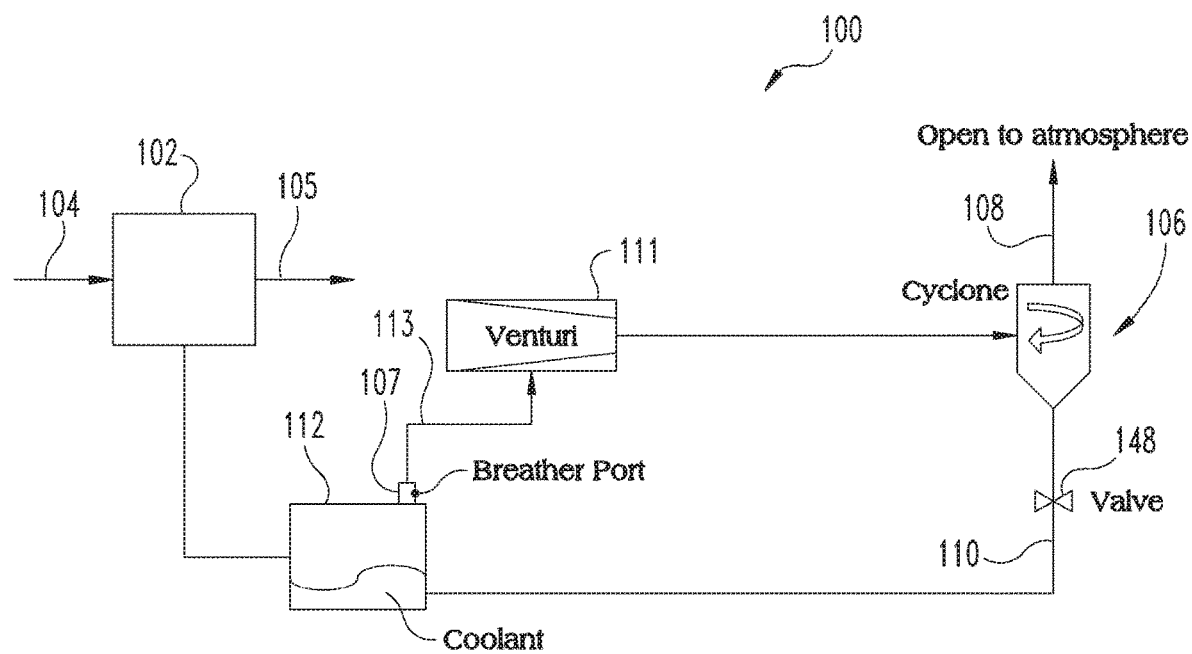
FIG. 1 depicts an embodiment of an air compressor system that produces a mixed flow of air and oil.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 discloses an embodiment of a compressor system 100 that includes a compressor 102 that receives air 104 to be compressed and delivered to a customer in the form of compressed air 105. The compressor 102 uses oil during operation for cooling and/or lubrication purposes. In one non-limiting embodiment the compressor is an oil free compressor, such as but not limited to an oil free screw compressor. Though the compressor is described as an oil free compressor, such a description is related to whether oil is also utilized in the compression process of the air 104. Such compressors may nevertheless still use oil for cooling and/or lubrication of its internal components.

The compressor 102 is structured to receive oil from an oil reservoir 112 which includes a breather port 107. The breather port 107 permits the oil reservoir 112 to breath and in so doing can produce a mixed stream of air and oil 113. Such a mixed stream can be provided to a separator 106 which is useful to recover the oil to be returned to the reservoir 112. One or more individual components of the separator 106 (some of which are discussed below) are useful to separate the oil from air as will be appreciated. The separator 106 can produce an outflow of air 108 as well as a recovered amount of oil 110 to be returned to the oil reservoir 112. In some forms a separate venturi 111 is used to accelerate the mixed flow of air and oil 113 prior to separation activity within the separator 106. In some embodiments the venturi 111 is integrated within the separator 106.

Though the embodiment as illustrated includes just a few components such as the compressor 102 and separator 106, other embodiments can include fewer or more components. For example, the compressor system 100 can include a refrigerated dryer, oil cooler, thermal valve for oil, etc.

Figure 2:
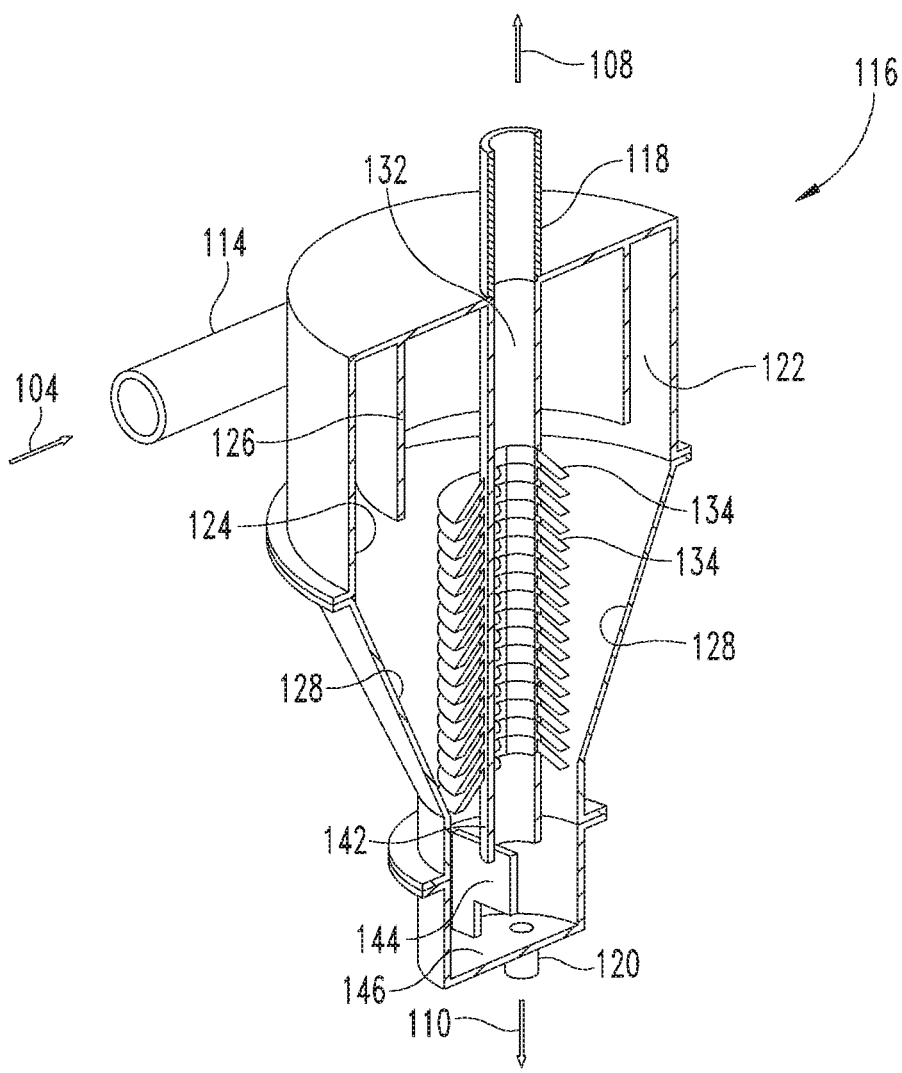
FIG. 2 depicts an embodiment of a cyclonic separator for an air compressor.
Figure 3:
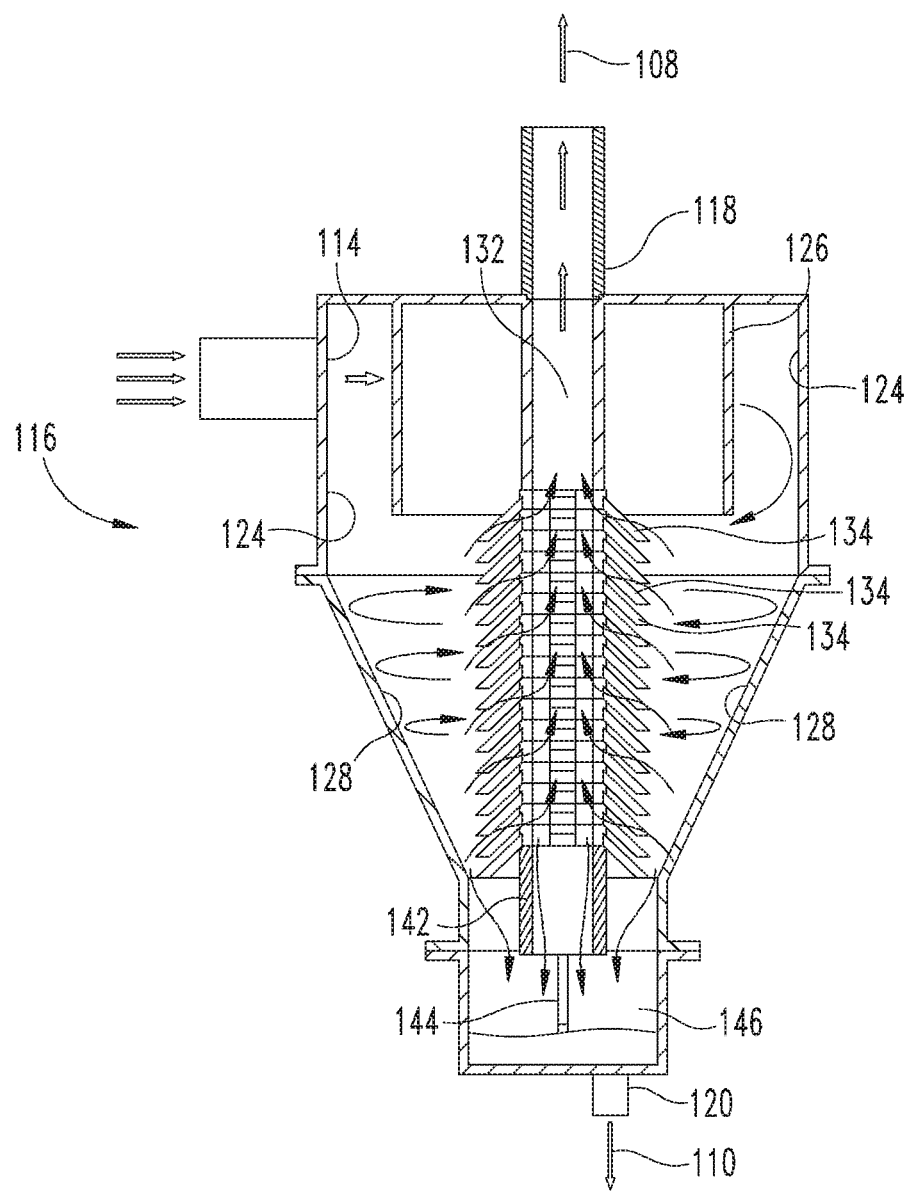
FIG. 3 depicts an embodiment of a cyclonic separator for an air compressor.

Turning now to FIGS. 2 and 3, one embodiment of a separator 106 is shown in more detail. The separator 106 is structured as a cyclonic separator and includes an inlet 114 for receipt of an air-oil mixture 113 (where the inlet 114 may include the venturi 111), a housing 116 that encloses internal passageways for separating oil from air, an air outlet 118 for the conveyance of air 108, and an oil outlet 120 for the return of oil 110 separated from the air exiting the breather 107.

The inlet 114 provides a flow of mixed air and oil from the oil reservoir 112 to an annulus 122 located between an inner wall 124 and a baffle 126. The flow of mixed air and oil can be delivered through the inlet 114 in a tangential flow direction to the annulus 122 to create a circumferential rotating flow of oil and air. The rotating flow can "spin" oil out of the flow and onto the inner wall 124, where it runs down toward a bottom portion internal to the housing as will be discussed further below. The baffle 126 can extend from a top portion of an interior of the separator 106 any sufficient distance to facilitate the circumferential swirling of the oil and air mixture. As shown in the illustrated embodiment, the inner wall 124 can extend further down than a bottom of the baffle 126, but not all embodiments need be arranged in this manner. A bottom of the baffle 126 can coincide with, or extend further below a bottom portion of the inner wall 124.

The separator 106 also includes a tapered inner wall 128 extending away from the annulus 122 and which gradually decreases in cross sectional area. The tapered inner wall 128 is intended to further direct the flow of oil and air and, as in the inner wall 124 above, can be used to receive oil that is "spun" out of the flow through the cyclonic rotating flow. The shape of the tapered inner wall 128 can take a variety of forms with any shape. In one form the tapered shape is or includes a cone, whether the cone is an upright cone, inclined cone, offset cone, etc. The walls can linearly converge toward a bottom, or can converge in another manner which may not be entirely straight.

The separator 106 also includes a center post 130 having an internal passage 132 and a number of discs 134 offset from one another, and in which openings are provided in the center post 130 to permit air to flow from a location outside of the center post 130 to the internal passage 132. The discs 134 can also aid in air-oil separation. Though the post 130 is referred to as a center post, the center post need not be located in the precise center of the housing unless otherwise explicitly stated to the contrary. Thus, the term "center post" as used herein is intended to refer to a post that is central to the open interior but need not be in the exact "center." In one non-limiting form the center post 130 is formed as a unitary device, but in other forms the center post 130 is an integrated device formed from a number of separate discs 134 that are brought together to form the center post 130.

Figure 4:
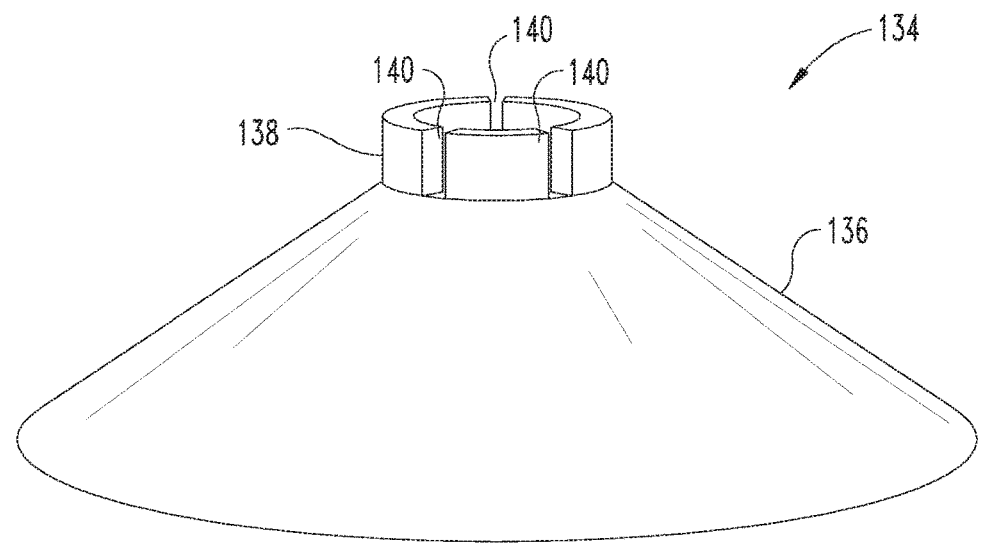
FIG. 4 depicts an embodiment of a disc.

Turning now to FIG. 4, and with continuing reference to FIGS. 2 and 3, one embodiment of the discs 134 which are formed as separate disc components is illustrated which includes a skirt 136 protruding away from a neck 138. The skirt 136 can take on any variety of forms including a conical shape and can have a variety of thicknesses. The conical shape itself can take on a variety of forms, including offset, inclined, etc. The narrow portion of the skirt is closer to the baffle 126 than the bottom of the separator 106, but in some embodiments the relationship can be swapped. Not all disc components in the center post 130 need be the same. The neck 138 extends from a top of the skirt 136 and can include any number of slots 140 that serve to provide the openings (mentioned above) in the center post 130 to permit fluid to flow to the internal passage 132. Any number and shape of slots 140 can be provided in the neck 138. For example, though the slots 140 are shown as vertical shaped slots in FIG. 4, the slots can take on the horizontal arrangement as shown in FIGS. 2 and 3. In other embodiments the slots 140 can be replaced by circular shaped holes. In still others, the top portion of the neck 138 may include a non-planar shape such that offset gaps are provided to permit fluid to pass. In short, any shape and size of openings are contemplated herein to permit fluid to pass into the internal passage 132.

In many embodiments the neck 138 can be formed to rest up under the skirt of an adjacent disc 134. In the stacked configuration which includes a number of separate discs 134 integrated together, the discs 134 can be fastened together using any suitable techniques, including any one or more of metallurgical fastening, mechanical fastening, and chemical bonding, to set forth just a few nonlimiting possibilities.

The center post 130 can include a portion below and a portion above the arrangement of discs 134, but other embodiments need not include any additional portions. In the illustrated embodiment the center post 130 includes a spacer 142 at the bottom of the discs 134 and another component above the discs 134 which together interface with the top and bottom discs to retain the assembly in place. The spacer 142 in the illustrated embodiment is a tubular component that is separate but compatible with the discs 134 and provides a space between the discs 134 and a bottom of the separator 106. The spacer 142 can include an open interior, but need not in all embodiments. In the illustrated embodiment the spacer 142 sits upon a rest 144 located at the bottom of the separator 106. In one non-limiting form the center post can include a portion below the arrangement of discs 134 (as shown in the spacer 142 in FIGS. 2 and 3) but not above the discs 134, while in others the center post may not include any portion above or below the discs 134.

An oil collector 146 can be arranged toward the bottom of the separator 106 and is structured to collect oil separated from the air/oil mixture 113 entering through inlet 114. The oil collector is in fluid communication with the oil outlet 120 which returns oil flow 110 to the oil reservoir 112. The oil collector 146 can be any size and shape. In some embodiments, a valve 148 can also be provided in the return line 110. The valve 148 can be controlled manually and/or electronically, and in some forms is a timed-solenoid. The valve 148 can be opened to permit flow of oil from the separator 106 to the oil reservoir 112 when the compressor is not running, and closed when the compressor is running.

The housing 116 can include any number of individual pieces coupled together, and in some forms is a unitary member. As shown in the illustrated embodiment, an upper portion of the housing 116 includes the inner wall 124, while a lower portion includes the tapered inner wall 128. The two portions can be fitted together and secured in any variety of manners, including mechanical fastening, metallurgical or chemical bonding, etc.

Note in the illustrated embodiments that the inner wall 124 extends further below a bottom of the baffle 126, and that the skirts of the center post can be located above the bottom of the inner wall, and can even extend above the bottom of the baffle 126. Other relative arrangements are contemplated herein.

One aspect of the present application an apparatus comprising a cyclonic separator having a housing with a circular shaped internal wall and an inlet passage oriented to deliver a flow of fluid tangential to the internal wall to form a swirling motion of fluid, the housing also having a tapered internal wall in which a wide end of the tapered internal wall is proximate the circular shaped internal wall and a narrow end of the tapered internal wall extends axially away from the circular shaped internal wall, the cyclonic separator including a center post having a central passage structured to convey the flow of fluid, the center post also including a plurality of tapered skirts oriented along a length of the center post and a plurality of openings between adjacent tapered skirts of the center post, wherein a flow path is formed from the inlet passage through an interior of the tapered internal wall, into the plurality of openings between adjacent tapered skirts, and into the central passage of the center post.

A feature of the present application provides wherein the tapered internal wall is conical shaped.

Another feature of the present application provides wherein the tapered skirts are conical shaped.

Still another feature of the present application provides wherein the conical shaped skirts are oriented such that a taper of the skirt is oriented with a wide end toward the tapered end of the tapered internal wall and a narrow end of the skirt is oriented toward the circular shaped internal wall.

Yet another feature of the present application provides wherein the conical shaped skirts are a plurality of individual center post members that collectively are layered upon one another to form the center post.

Still yet another feature of the present application further includes an inlet baffle disposed radially inward of the circular shaped internal wall and forming an annulus within which fluid delivered via the inlet passage can circulate, the fluid circulating in swirling motion within the annulus.

Yet still another feature of the present application provides wherein the center post further includes a portion that extends interior to the baffle and that lacks any tapered skirts.

A further feature of the present application further includes an air compressor having an oil reservoir that provides the flow of fluid via a breather port, wherein the flow of fluid is an air-oil mixture, and wherein the cyclonic separator structured to scavenge oil from the air-oil mixture.

Another aspect of the present application provides an apparatus comprising a cyclonic separator structured for use with a mixed flow of oil and air, the cyclonic separator having: an inlet annulus structured to impart a circumferential swirl to the mixed flow of oil and air, an enclosure in fluid communication with and projecting axially away from the inlet annulus and having a first wide end disposed near the inlet annulus and a second narrow end disposed away from the inlet annulus, the enclosure having a progressively narrowing wall structure between the first wide end and the second narrow end, a center post disposed internal to the enclosure and having a plurality of stacked discs arranged along its length, the center post including a central passage interior to an outer periphery of the stacked discs, and a plurality of openings disposed along the length of the center post between adjacent stacked discs, the openings providing fluid communication between the inlet annulus and the central passage of the center post.

A feature of the present application provides wherein the discs are conical shaped.

Another feature of the present application provides wherein the conical shaped discs are oriented such that the narrow end of the conical shape is oriented toward the inlet annulus and the wide end is oriented away from the inlet annulus.

Yet another feature of the present application provides wherein the stacked discs are fastened together.

Still another feature of the present application provides wherein the progressively narrowing wall structure of the enclosure is conical in shape.

Yet still another feature of the present application further includes an oil collector disposed at an end of the center post away from the inlet annulus, wherein the center post includes a first stacked disc near the narrow end and a last stacked disc near the wide end, and wherein a gap offset is provided between the progressively narrowing wall structure of the enclosure and the first stacked disc.

Still yet another feature of the present application provides wherein the inlet annulus is disposed between a first circular shaped internal wall of a housing and a baffle disposed radially inward of the first circular shaped internal wall.

A further feature of the present application provides wherein the center post projects in a direction internal to the baffle, and wherein at least one of the stacked discs reside axially within a bottom portion of the baffle.

A still yet further feature of the present application further includes an air compressor system having an oil reservoir that includes a fluid flow path that conveys oil, the fluid flow path in fluid communication with a venturi positioned upstream of the inlet annulus.

Still another aspect of the present application provides a method comprising providing a flow of mixed oil and air to an annulus of a cyclonic separator, swirling the flow of mixed oil and air circumferentially around the annuls, migrating the swirling flow of mixed oil and air axially away from the annulus into a tapered housing that includes a center post defined by a plurality axially spaced center discs, and venting at least air of the mixed oil and air through openings disposed along the center post between the axially spaced center discs.

A feature of the present application provides wherein the axially spaced center discs are conical in shape, and which further includes turning at least a flow of air from the direction axially away from the annulus to a direction axially toward the annulus when the flow of air encounters the axially spaced center discs.

Another feature of the present application further includes collecting oil in an oil collector positioned below the center post, and wherein at least one disc of the plurality of axially spaced discs extends into a baffle which defines an inner flow path of the annulus.

Still another feature of the present application further includes routing a flow of at least air of the mixed oil and air into an opening proximate a top disc of the plurality of axially spaced discs, the top disc including positioned axially above the tapered housing.

Yet another feature of the present application provides wherein the top disc is located axially above a bottom edge of the baffle.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a cyclonic separator having a housing with a circular shaped internal wall and an inlet passage oriented to deliver a flow of fluid tangential to the internal wall to form a swirling motion of fluid, the housing also having a tapered internal wall in which a wide end of the tapered internal wall is proximate the circular shaped internal wall and a narrow end of the tapered internal wall extends axially away from the circular shaped internal wall, the cyclonic separator including a center post having a central passage structured to convey the flow of fluid, the center post also including a plurality of tapered skirts oriented along a length of the center post and a plurality of openings between adjacent tapered skirts of the center post, wherein the center post further includes a portion within the housing that extends above the tapered skirts, wherein a flow path is formed from the inlet passage through an interior of the tapered internal wall, into the plurality of openings between adjacent tapered skirts, and into the central passage of the center post, the cyclonic separator further including an inlet baffle disposed radially inward of the circular shaped internal wall, the inlet baffle having a different shape than the plurality of tapered skirts, wherein the inlet baffle includes a non-tapered shape.

2. The apparatus of claim 1, wherein the tapered internal wall is conical shaped.

3. The apparatus of claim 1, wherein the tapered skirts are conical shaped.

4. The apparatus of claim 1, wherein the conical shaped skirts are oriented such that a taper of the skirt is oriented with a wide end toward the tapered end of the tapered internal wall and a narrow end of the skirt is oriented toward the circular shaped internal wall.

5. The apparatus of claim 4, wherein the conical shaped skirts are a plurality of individual center post members that collectively are layered upon one another to form the center post.

6. The apparatus of claim 4, wherein the inlet baffle and the circular shaped internal wall form an annulus within which fluid delivered via the inlet passage can circulate, the fluid circulating in swirling motion within the annulus.

7. The apparatus of claim 6, wherein the center post further includes another portion that extends interior to the inlet baffle and that lacks any tapered skirts.

8. The apparatus of claim 7, which further includes an air compressor having an oil reservoir that provides the flow of fluid via a breather port, wherein the flow of fluid is an air-oil mixture, and wherein the cyclonic separator structured to scavenge oil from the air-oil mixture.

9. The apparatus of claim 1, wherein the non-tapered shape is cylindrical.

10. The apparatus of claim 1, wherein at least one of the plurality of tapered skirts extends into an interior of the inlet baffle.

11. The apparatus of claim 1, which further includes a spacer adjacent to the plurality of disks and on an opposite end of the plurality of disks from the center post.

12. The apparatus of claim 11, wherein the spacer is tubular having an open interior and is in contact with a rest located at a bottom of the cyclonic separator.

13. The apparatus of claim 1, wherein each of the plurality of tapered skirts includes a neck, wherein each neck includes a slot, and wherein the slot forms the openings between adjacent tapered skirts.

* * * * *